No. 697,973. Patented Apr. 22, 1902.
J. BRENZINGER.
CAN FLANGING MACHINE.
(Application filed Aug. 31, 1901.)
(No Model.) 2 Sheets—Sheet 1.
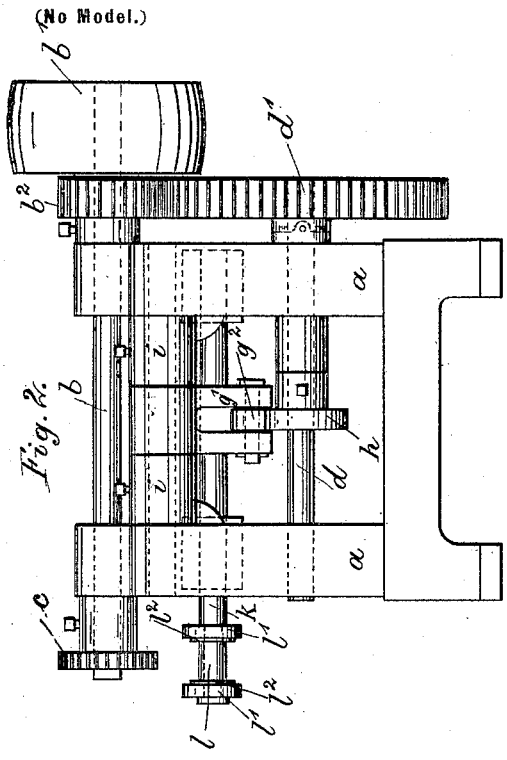
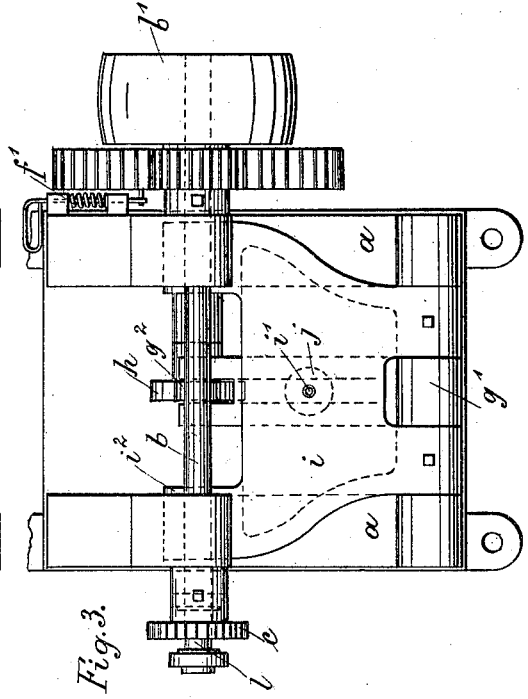
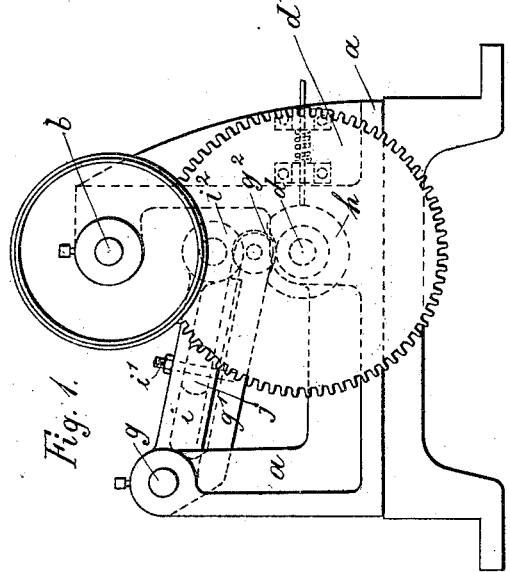
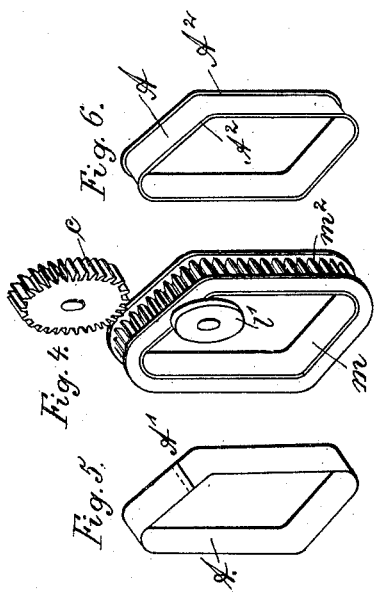
Witnesses: Inventor:
Arthur Lumpe Julius Brenzinger
Edward Ray by his attorneys
Roeder & Bresen No. 697,973. Patented Apr. 22, 1902.
J. BRENZINGER.
CAN FLANGING MACHINE.
(Application filed Aug. 31, 1901.)

(No Model.) 2 Sheets—Sheet 2.

Witnesses
Arthur Lump
Edward Ray

Inventor:
Julius Brenzinger
by his attorneys
Roeder & Briesen

UNITED STATES PATENT OFFICE.

JULIUS BRENZINGER, OF NEW YORK, N. Y., ASSIGNOR TO MAX AMS, OF NEW YORK, N. Y.

CAN-FLANGING MACHINE.

SPECIFICATION forming part of Letters Patent No. 697,973, dated April 22, 1902.

Application filed August 31, 1901. Serial No. 73,916. (No model.)

*To all whom it may concern:*

Be it known that I, JULIUS BRENZINGER, a citizen of Germany, and a resident of New York city, county and State of New York, have invented certain new and useful Improvements in Can-Flanging Machines, of which the following is a specification.

This invention relates to an improved machine for flanging the ends of a can-body. The machine is provided with a removable work-holding frame shaped to conform to the shape of the can-body to be flanged. By selecting differently-shaped frames the same machine can be used for flanging can-bodies of square, rectangular, round, polygonal, or any other shape desired.

Figure 7:
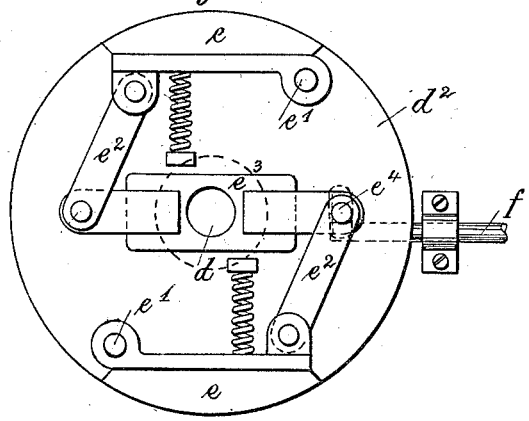
Figure 8:
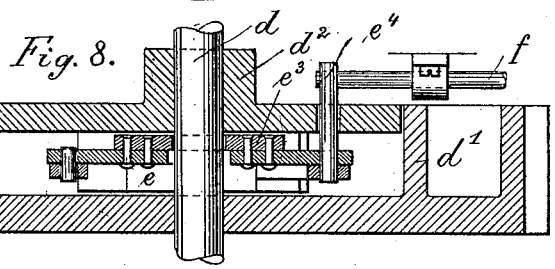
Figure 9:
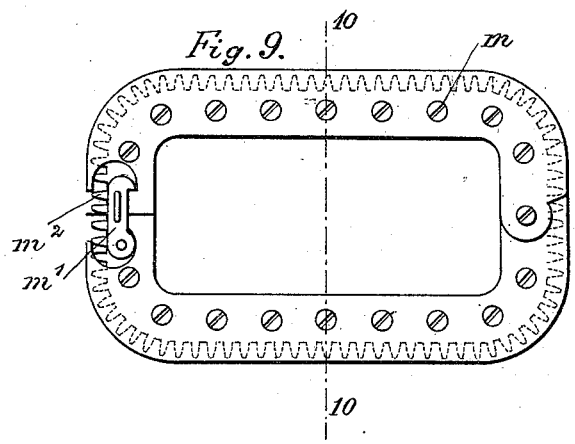
Figures 10, 11:
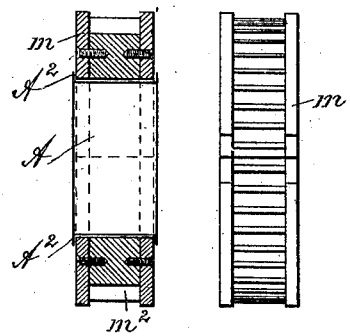

In the accompanying drawings, Figure 1 is a side elevation of my improved can-flanging machine; Fig. 2, a rear elevation thereof; Fig. 3, a plan; Fig. 4, a detail perspective view of the work holder and driver; Fig. 5, a perspective view of the can-body before being flanged; Fig. 6, a similar view of the can-body after being flanged; Fig. 7, an enlarged face view of the clutch; Fig. 8, an enlarged cross-section thereof; Fig. 9, a side view, partly in section, of the work-holder; Fig. 10, a cross-section on line 10 10, Fig. 9; and Fig. 11 an end view of Fig. 9.

The letter $a$ represents the frame of the machine, in which is hung the power-shaft $b$, driven from pulley $b'$. The shaft $b$ carries at one end a toothed wheel $c$, which rotates and also compresses the work, as hereinafter more fully described. A counter-shaft $d$ is intergeared by wheels $b^2$ $d'$ with the power-shaft $b$. The wheel $d'$ is coupled to shaft $d$ by a suitable clutch, Figs. 7 and 8, which is so constructed that it will automatically uncouple from shaft $d$ upon a complete rotation of the latter. The clutch is shown to consist of two spring-influenced jaws $e$, pivotally connected at $e'$ to a head $d^2$, fast on shaft $d$. Links $e^2$ connect the jaws $e$ with a collar $e^3$, encircling shaft $d$. A spring-influenced push-pin $f$ projects across the path of a pin $e^4$ of one of the links $e^2$. When the pin $f$ is withdrawn, the jaws $e$ will bear against the inner side of wheel $d'$, so that the shaft $d$ is taken along by the shaft $b$. When the shaft $d$ has made one complete rotation, the pin $f$, which has been retracted by its spring $f'$, will intercept the pin $e^4$, and thus cause the clutch to open and the shaft $d$ to be arrested until the push-pin is again drawn out.

Upon a shaft $g$ turns an arm $g'$, carrying roller $g^2$, which engages a cam $h$, fast on shaft $d$. To arm $g'$ is connected a second arm $i$ by means of a set-screw $i'$, while a buffer $j$ is interposed between the arms. The arm $i$ also turns on or with shaft $g$. The object of the adjustment $i'$ is to set the machine to operate upon blanks of different thickness, while the buffer $j$ serves to compensate for any unevenness in the work-piece A, particularly at the seam A'.

The arm $i$ is provided at its free end with a tubular bearing $i^2$ for a shaft $k$, which projects with one end underneath the wheel $c$ of shaft $b$. Upon this end of shaft $k$ is loosely mounted a sleeve $l$, having heads $l'$ and a seat or shoulder $l^2$ on the inner side of each head.

The work-piece A, Fig. 5, to be provided with a flange $A^2$ at each end, Fig. 6, is fitted within a frame or work-holder $m$, Fig. 9, which is composed of two hinged sections adapted to be closed by a suitable catch $m'$. The inner side or opening of frame $m$ corresponds in shape to the contour of the can-body to be flanged. Thus the drawings show a frame adapted to hold an oblong can-body; but by replacing this frame by one of round, polygonal, or any other suitable shape the same machine can be used for flanging can-bodies of all possible forms without any adjustment whatever of the machine proper.

The frame $m$ should be of a width slightly less than the distance between the shoulders $l^2$, so that when unsupported it would settle upon the sleeve $l$ between said shoulders. Teeth $m^2$, formed on the circumference of frame $m$, are adapted to be engaged by wheel $c$ in the elevated position of shaft $k$, so that the frame is simultaneously placed under pressure and rotated.

The operation is as follows: The can-body to be flanged is set into a frame $m$ of a width somewhat less than that of the can-body, so that the edges of the latter protrude beyond both faces of the frame. The frame is then hung upon the sleeve $l$, so that the protruding ends of the blank A are supported upon the seats $l^2$ and are gaged by the heads $l'$. The push-pin $f$ being withdrawn to couple the shaft $d$ to the power-shaft $b$ by clutch $e$, the arms $g'$ $i$ are oscillated by cam $h$ to move the shaft $k$ upwardly and bring the teeth $m^2$ of frame $m$ into engagement with the wheel $c$. This wheel is of a width to fit between the seats $l^2$, and it will thus not only rotate the frame $m$, but it will also act as a plunger or upsetting device for pushing the frame upon the sleeve $l$ between the seats $l^2$. In this way the center portion of the blank A is pressed inward or down upon the body of sleeve $l$ between the shoulders $l^2$, while the ends of the blank which had been supported upon these shoulders are by them turned up at right angles. When the shaft $d$ has made a complete rotation, the shaft $k$ descends, owing to the shape of cam $h$, and is then arrested, so that the frame may be removed to take out the flanged can-body and replace it by a new one.

What I claim is—

1. A can-flanging machine having a removable work-holding frame, composed of a pair of hinged sections, a catch for closing the frame, and teeth on the periphery of the frame, substantially as specified.

2. In a can-flanging machine, the combination of a flanged seat adapted to support the ends of a blank, with a frame embracing the blank, and with a wheel adapted to force the can-body inwardly between the seats and simultaneously rotate the same, substantially as specified.

3. A can-flanging machine provided with a flanged sleeve, a removable toothed work-holding frame adapted to be mounted thereon, a gear-wheel, and means for throwing the frame into and out of engagement with said wheel, substantially as specified.

4. A can-flanging machine provided with a shaft, a flanged sleeve mounted thereon, a removable toothed work-holding frame adapted to be mounted upon the sleeve, a gear-wheel, and means for throwing the frame into and out of engagement with said wheel, substantially as specified.

5. A can-flanging machine having a power-shaft, a counter-shaft, an intervening clutch, a cam on the counter-shaft, an arm oscillated by the cam, a shaft movable with the arm, a flanged sleeve rotatable upon the shaft, a work-holding frame adapted to be suspended from the sleeve, and a wheel adapted to engage said frame, substantially as specified.

6. A can-flanging machine having a power-shaft, a counter-shaft, an intervening clutch, a cam on the counter-shaft, a pair of arms oscillated by the cam, means for adjusting the arms, a buffer between the arms, a shaft movable with the arms, a flanged sleeve upon the shaft, a toothed work-holding frame, and a toothed wheel adapted to engage said frame, substantially as specified.

Signed by me at New York city, county and State of New York, this 30th day of August, 1901.

JULIUS BRENZINGER.

Witnesses:
WILLIAM SCHULZ,
F. V. BRIESEN.